United States Patent Office 2,905,743
Patented Sept. 22, 1959

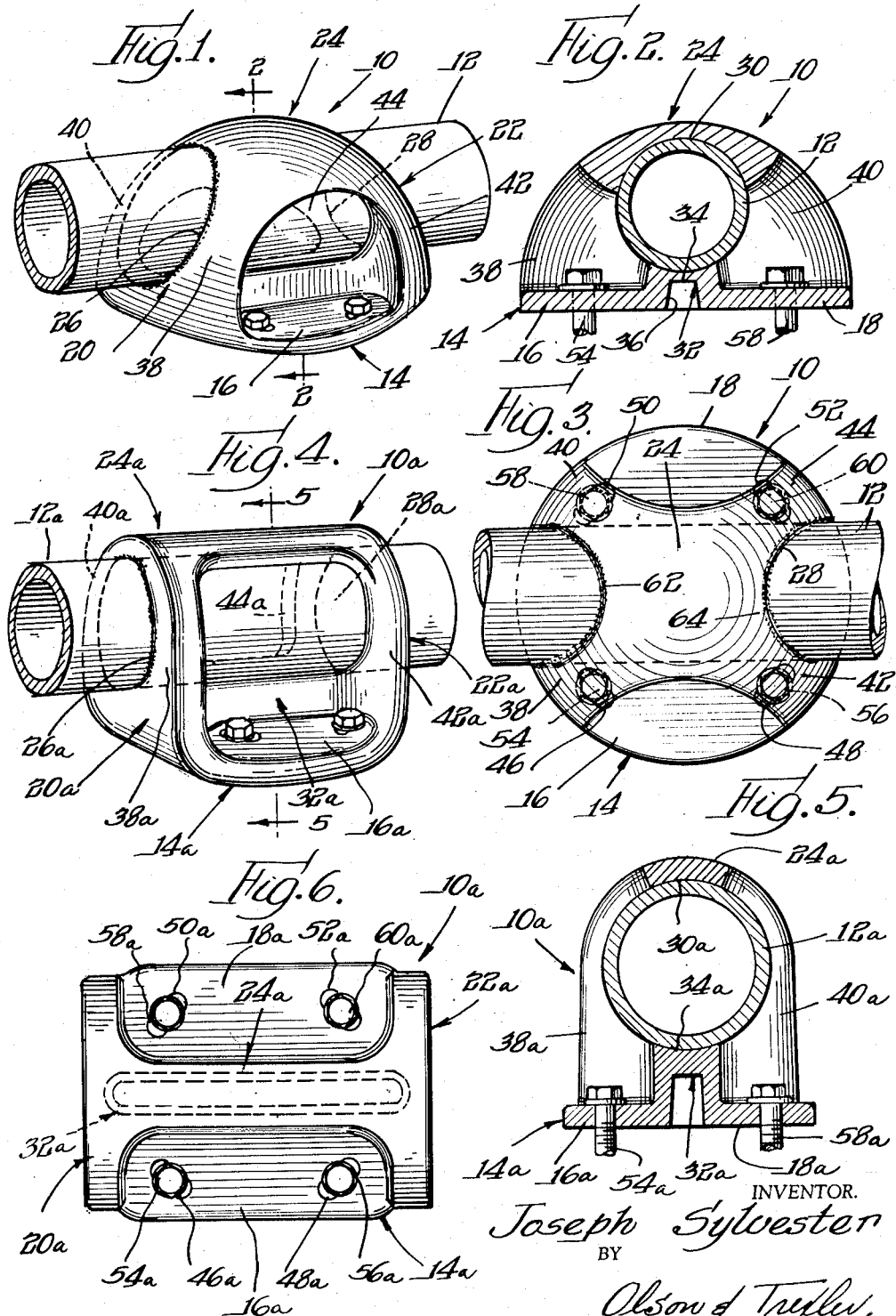

2,905,743

ELECTRICAL BUS SUPPORT

Joseph Sylvester, Erie, Pa., assignor to Penn-Union Electric Corporation, Erie, Pa., a corporation of Pennsylvania Application December 14, 1956, Serial No. 628,386

6 Claims. (Cl. 174—73)

The present invention relates to a novel electrical bus support, and more particularly to a novel support member adapted to accommodate tubular buses of the type used in power substations.

An important object of the present invention is to provide a novel bus support member adapted to be secured to an insulator or the like of a complementary support structure and to retain an electrical bus either securely or in a manner which permits the bus to slide during expansion and contraction thereof.

A more specific object of the present invention is to provide a novel bus support member of simple, economical and rugged construction, which support member may be easily and securely welded to an electrical bus, if desired, and is also adapted to retain an electrical bus with a slip fit for accommodating expansion and contraction.

Still another object of the present invention is to provide a novel bus support member of the above described type which is constructed so that it may be used in installations involving extremely high voltages without any substantial danger or corona.

Other objects and advantages of the present invention will become apparent from the following description and the accompanying drawings wherein:

Fig. 1 is a fragmentary perspective view showing a support member incorporating the features of the present invention assembled with a tubular bus;

Fig. 2 is a sectional view taken along line 2—2 in Fig. 1;

Fig. 3 is a plan view of the assembly shown in Fig. 1;

Fig. 4 is a fragmentary perspective view showing a support member incorporating a modified form of the present invention assembled with a tubular bus;

Fig. 5 is a cross sectional view taken along line 5—5 in Fig. 4; and

Fig. 6 is a plan view of the support member shown in Fig. 4.

Referring now more specifically to the drawings wherein like parts are designated by the same numerals throughout the various figures, a support member 10 incorporating features of the present invention is shown in Figs. 1, 2 and 3. The support member is adapted to be used in connection with a tubular electrical bus 12 which in many installations is formed from an aluminum alloy, and for such installations the support member is preferably cast from a non-heat treatable high strength aluminum alloy such for example as ASTM ZG 32A which is commercially available under the Apex Smelting Ternalloy 5. Such an aluminum alloy does not lose its physical properties or strength when subjected to welding temperatures so that the support member may be welded to the bus in the manner described below without weakening the structure.

The support member 10 includes a base portion 14 having opposite side substantially flat sections 16 and 18. End portions 20 and 22 extend laterally or upwardly from integral junctions with opposite ends of the base portion 14, which end portions merge with a top portion 24. Apertures 26 and 28 are formed in the end portions 20 and 22 respectively for receiving the tubular bus 12, which apertures are formed so that their margins closely conform to the peripheral surface of the bus. The top portion 24 is provided with an internal seat or surface 30 having arcuate transverse configuration concentric with the apertures 26 and 28 for supporting the bus between the end portions, and the base portion 14 is provided with a longitudinally extending upwardly projecting rib section 32 which also has a longitudinally extending seat or surface 34 of transverse arcuate configuration opposing the surface 30 and further supporting the bus between the end portions. A groove 36 is formed in the rib section oppositely from the surface 34 so as to provide the rib section with an inverted generally U-shaped cross section and a wall thickness not substantially exceeding the wall thickness of the remaining base sections 16 and 18.

As shown in the drawings, the apertures 26 and 28 in effect provide the end portions 20 and 22 with corner struts 38—40 and 42—44. It is to be noted that these corner struts, the base portion 14 and the top portion 24 combine to provide the support member with a projected substantially semi-spherical peripheral configuration so that the strength and ruggedness of the support member is enhanced. Furthermore, since the peripheral surfaces of the various portions of the support member are rounded or portions of a sphere, any possibility of the occurrence of corona even when the support member is used in an installation involving extremely high voltages is substantially eliminated.

The base sections 16 and 18 are respectively provided with slots 46—48 and 50—52 for accommodating bolts or screws 54, 56, 58 and 60 respectively which are adapted to secure the support member to an insulator or complementary support structure, not shown. These slots are spaced about and extend circumferentially of an imaginary circle which is concentric with the base portion 14 so that the support member may be turned or adjusted about the axis of this circle to align the common axis of the apertures 26 and 28 and thus a bus extending through these apertures with another portion of the installation, not shown, to which the bus is to be secured.

In certain installations, the support member 10 is to be rigidly connected with the bus 12. This is accomplished by providing weld beads 62 and 64 between the bus and the outer margins of the apertures 26 and 28 as shown in Fig. 3. It is to be noted that since the end portions 20 and 22 are curved or spherical, the margins of the apertures are of greater overall length as compared with the margins of apertures in portions disposed perpendicular to the axis of the bus, and as a result longer weld beads may be provided for superior strength. Weld beads, not shown, may also be provided between the bus and the straight inner edge of the support member such as the edges of the rib section. It is also to be understood that in certain installations it is desired to permit the bus 12 to slide relative to the support member, and in such installations the weld beads 62 and 64 are omitted.

Figs. 4, 5 and 6 show a modified embodiment of the present invention having many of the advantages and features of the above described structure. In these figures elements which correspond to those described above are identified by identical numerals with the suffix *a* added. This embodiment differs in that it has a generally box-like overall configuration rather than a substantially semi-spherical configuration. More specifically, the end portions 20*a* and 22*a* extend substantially perpendicularly from the base portion and the top portion 24*a* is in the form of an elongated element extending between the end portions. The end portions, the base portion and the top portion are provided with well rounded corners and junctions so as to reduce any possibility of the occurrence of corona. One advantage of this embodiment is that engagement with a greater length and area of the bus is obtained, particularly by the top portion 24a.

While the preferred embodiments of the present invention have been shown and described herein, it is obvious that many structural details may be changed without departing from the spirit and scope of the appended claims.

The invention is claimed as follows:

1. A support member for an electrical bus comprising a one-piece casting including a base portion adapted to be secured to a complementary support structure, a pair of axially spaced end portions respectively extending laterally from opposite ends of said base portion, said end portions having axially aligned apertures therethrough for closely and slidably receiving and retaining a bus, and a top portion extending between said end portions and having an inner surface facing said base portion for engaging and supporting a part of a bus between said end portions when the bus is inserted into said apertures, said top and end portions defining side opening means exposing a section of said base potrion between said opposite end portions, said section of said base portion having aperture means therein for accommodating fastener means for mounting the support member to said complementary support structure, said support member selectively serving rigidly to retain a bus when connected thereto by weld beads provided between the bus and margins of said apertures and to slidably retain the bus when the weld beads are omitted, said base, top and end portions having substantially all exterior edges thereof rounded, said exterior edges defining recess means therewithin, and said fastener means accommodating aperture means in said base portion being disposed for locating a part of a fastening means adapted to overlie the base portion within at least some of said edges.

2. A support member, as defined in claim 1, wherein said base portion includes a central laterally projecting rib section having a surface opposing said first mentioned surface for further supporting a part of a bus between said end portions when the bus is inserted into said apertures.

3. A support member, as defined in claim 1, wherein said end portions, said base portion and said top portion are segments of a semi-sphere for reducing any possibility of the occurrence of corona when the support member is used in a high voltage installation.

4. A support member for a tubular aluminum electrical bus comprising a one-piece non-heat treatable high strength aluminum alloy casting including a base portion having aperture means therein for receiving fastening means whereby the support member is adapted to be secured to a complementary support structure, said base portion having substantially flat opposite side sections and a central laterally projecting rib section, a pair of axially spaced end portions respectively extending laterally from opposite ends of said base portion in the same direction as said rib section, said end portions having axially aligned apertures therethrough for closely and slidably receiving and retaining a tubular bus, and a top portion extending between and integrally joined with outer extremities of said end portions, said top portion and said rib section respectively having opposing surfaces of arcuate transverse cross section for engaging and supporting opposite sides of a part of a bus between said end portions when the bus is inserted into said apertures, said base, end and top portions having rounded exterior edges for reducing any possibility of the occurrence of corona, said exterior edges defining recess means therewithin, and said fastener means accommodating aperture means in said base portion being disposed so as to locate part of the fastening means adapted to overlie the base portion at least partially within some of said edges.

5. A support member, as defined in claim 4, wherein said end portions extend substantially perpendicularly from said base portion and said rib section and top portion surfaces extend continuously between said end portions for engagement with a relatively long length of a bus inserted through said apertures.

6. A support member, as defined in claim 4, wherein said end portions and said top portion are substantially segments of a semi-sphere for reducing any possibility of the occurrence of corona when the support member is used in a high voltage installation.

References Cited in the file of this patent

UNITED STATES PATENTS

| | | |
|---|---|---|
| 448,550 | Scott | Mar. 17, 1891 |
| 2,197,728 | Lee | Apr. 16, 1940 |
| 2,616,646 | Matthysse | Nov. 4, 1952 |

FOREIGN PATENTS

| | | |
|---|---|---|
| 388,582 | Great Britain | Mar. 2, 1933 |
| 432,559 | Great Britain | July 26, 1935 |